(12) United States Patent
Cros et al.

(10) Patent No.: US 11,578,612 B2
(45) Date of Patent: Feb. 14, 2023

(54) DISTRIBUTOR FOR A TURBOMACHINE RADIAL TURBINE, TURBOMACHINE COMPRISING SUCH A DISTRIBUTOR AND AIR CONDITIONING SYSTEM COMPRISING SUCH A TURBOMACHINE

(71) Applicant: LIEBHERR-AEROSPACE TOULOUSE SAS, Toulouse (FR)

(72) Inventors: Sandrine Cros, Toulouse (FR); Mathieu Roumeas, Toulouse (FR); James Fouragnan, Toulouse (FR); Pierre-Thomas Lauriau, Toulouse (FR); Nicolas Binder, Toulouse (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 10 days.

(21) Appl. No.: 17/274,428

(22) PCT Filed: Sep. 3, 2019

(86) PCT No.: PCT/FR2019/052032
§ 371 (c)(1),
(2) Date: Mar. 8, 2021

(87) PCT Pub. No.: WO2020/049255
PCT Pub. Date: Mar. 12, 2020

(65) Prior Publication Data
US 2022/0049618 A1 Feb. 17, 2022

(30) Foreign Application Priority Data
Sep. 6, 2018 (FR) ...................................... 1857998

(51) Int. Cl.
*F01D 17/16* (2006.01)
*B64D 13/08* (2006.01)
*F04D 29/46* (2006.01)

(52) U.S. Cl.
CPC ........... *F01D 17/165* (2013.01); *B64D 13/08* (2013.01); *F04D 29/462* (2013.01); *F05D 2240/128* (2013.01); *F05D 2260/50* (2013.01)

(58) Field of Classification Search
CPC .... F01D 17/165; F01D 17/167; F04D 29/462; F04D 27/0246; F02B 37/24; F03B 3/183
See application file for complete search history.

(56) References Cited

U.S. PATENT DOCUMENTS 4,338,063 A * 7/1982 Nakanishi ............. F04D 29/462
  415/164
4,355,953 A * 10/1982 Nelson .................... F03B 3/183
  415/164

(Continued)

FOREIGN PATENT DOCUMENTS

DE  102010047251 A1 * 12/2011  ........... F01D 17/165
EP  1998026        12/2008

(Continued)

OTHER PUBLICATIONS

DE-102010047251—Translation from Espacenet (Year: 2011).*

*Primary Examiner* — Richard A Edgar
*Assistant Examiner* — Behnoush Haghighian
(74) *Attorney, Agent, or Firm* — CRGO Global; Steven M. Greenberg

(57) ABSTRACT

The invention relates to a distributor for a turbomachine radial turbine, comprising an annular grill (26) extending about a central axis (10) and comprising a plurality of variable-pitch blades (31), defining between them an air passage cross section, characterized in that each blade is rotatably mounted about a pivot shaft (32), itself moveable in a translation direction, comprising at least one radial component, such that said blade may, upon actuation of control means (40), be pivoted about the pivot shaft and/or moved in relation to the central axis in said translation (Continued)

Figure 3:
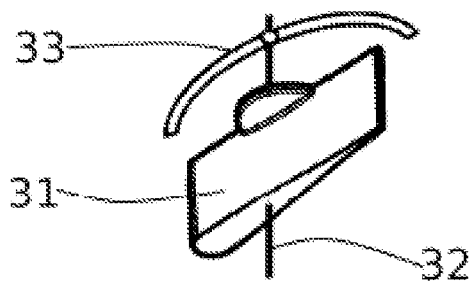

direction so as to be able to modify the air passage cross section by respectively controlling the metal angle (α3) and the radial spacing (ΔR).

7 Claims, 2 Drawing Sheets

(56) References Cited

U.S. PATENT DOCUMENTS

| | | | | |
|---|---|---|---|---|
| 4,657,476 A * | 4/1987 | Berg | ............... | F01D 17/165 415/164 |
| 4,780,049 A * | 10/1988 | Palmer | ............... | F04D 29/462 415/36 |
| 4,880,351 A | 11/1989 | Inoue et al. | | |
| 5,851,104 A * | 12/1998 | Dakin | ............... | F01D 17/165 415/164 |
| 6,419,464 B1 * | 7/2002 | Arnold | ............... | F01D 5/18 415/164 |
| 6,547,520 B2 * | 4/2003 | Zinsmeyer | ............... | F04D 29/462 415/164 |
| 6,672,059 B2 * | 1/2004 | Arnold | ............... | F01D 17/165 415/164 |
| 6,814,540 B2 * | 11/2004 | Sishtla | ............... | F04D 29/462 415/150 |
| 6,935,839 B2 * | 8/2005 | Pascoe | ............... | F04D 15/0055 415/206 |
| 7,140,839 B2 * | 11/2006 | McAuliffe | ............... | F01D 17/165 415/171.1 |
| 7,407,367 B2 * | 8/2008 | McAuliffe | ............... | F01D 17/165 415/164 |
| 8,240,984 B2 * | 8/2012 | Noelle | ............... | F04D 29/462 415/206 |
| 8,653,687 B2 * | 2/2014 | Madison | ............... | F03B 3/183 415/162 |
| 9,890,700 B2 * | 2/2018 | Sun | ............... | F01D 17/165 |
| 10,072,519 B2 * | 9/2018 | Beers | ............... | F01D 17/165 |
| 10,519,799 B2 * | 12/2019 | Sun | ............... | F02B 39/00 |
| 2002/0094284 A1 * | 7/2002 | Arnold | ............... | F01D 5/141 417/407 |
| 2002/0176774 A1 * | 11/2002 | Zinsmeyer | ............... | F04D 29/462 415/150 |
| 2002/0187061 A1 * | 12/2002 | Arnold | ............... | F02C 6/12 415/164 |
| 2004/0076513 A1 * | 4/2004 | Sishtla | ............... | F04D 29/462 415/150 |
| 2006/0062665 A1 * | 3/2006 | McAuliffe | ............... | F04D 29/462 415/191 |
| 2006/0062666 A1 * | 3/2006 | McAuliffe | ............... | F01D 17/165 415/191 |
| 2009/0155058 A1 * | 6/2009 | Noelle | ............... | F04D 29/624 415/162 |
| 2012/0082539 A1 * | 4/2012 | Mohiki | ............... | F01D 17/165 415/159 |
| 2012/0248786 A1 * | 10/2012 | Madison | ............... | F01D 17/165 290/1 R |
| 2014/0147278 A1 * | 5/2014 | Demolis | ............... | F01D 17/165 416/147 |
| 2014/0322000 A1 * | 10/2014 | Beers | ............... | F01D 17/165 415/208.1 |
| 2016/0146100 A1 * | 5/2016 | Sun | ............... | F01D 17/165 415/159 |
| 2018/0087453 A1 * | 3/2018 | Sun | ............... | F02B 39/00 |
| 2019/0153889 A1 * | 5/2019 | Hu | ............... | F01D 17/141 |
| 2019/0249611 A1 * | 8/2019 | Henzler | ............... | F04D 17/10 |

FOREIGN PATENT DOCUMENTS

| | | |
|---|---|---|
| FR | 3009347 | 2/2015 |
| WO | WO2008095568 | 8/2008 |

* cited by examiner

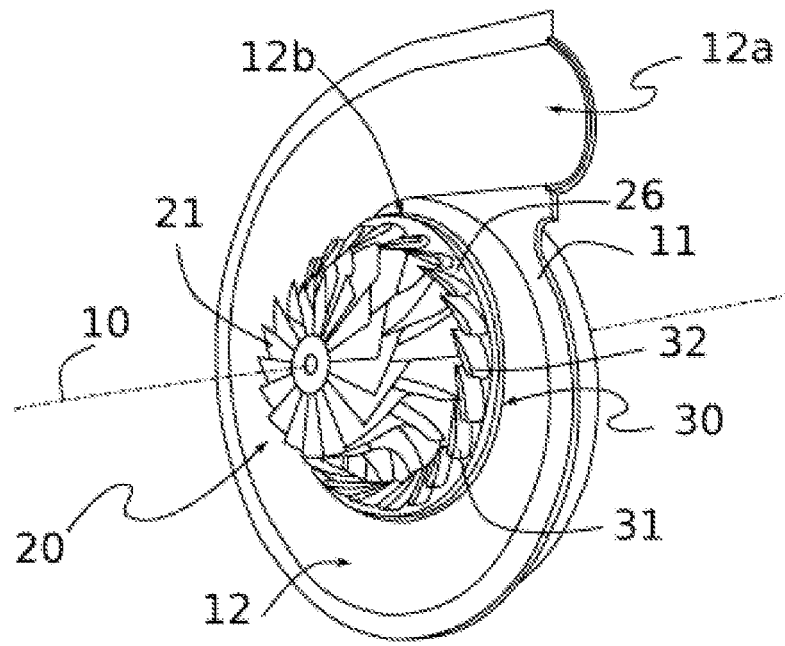
Fig. 1
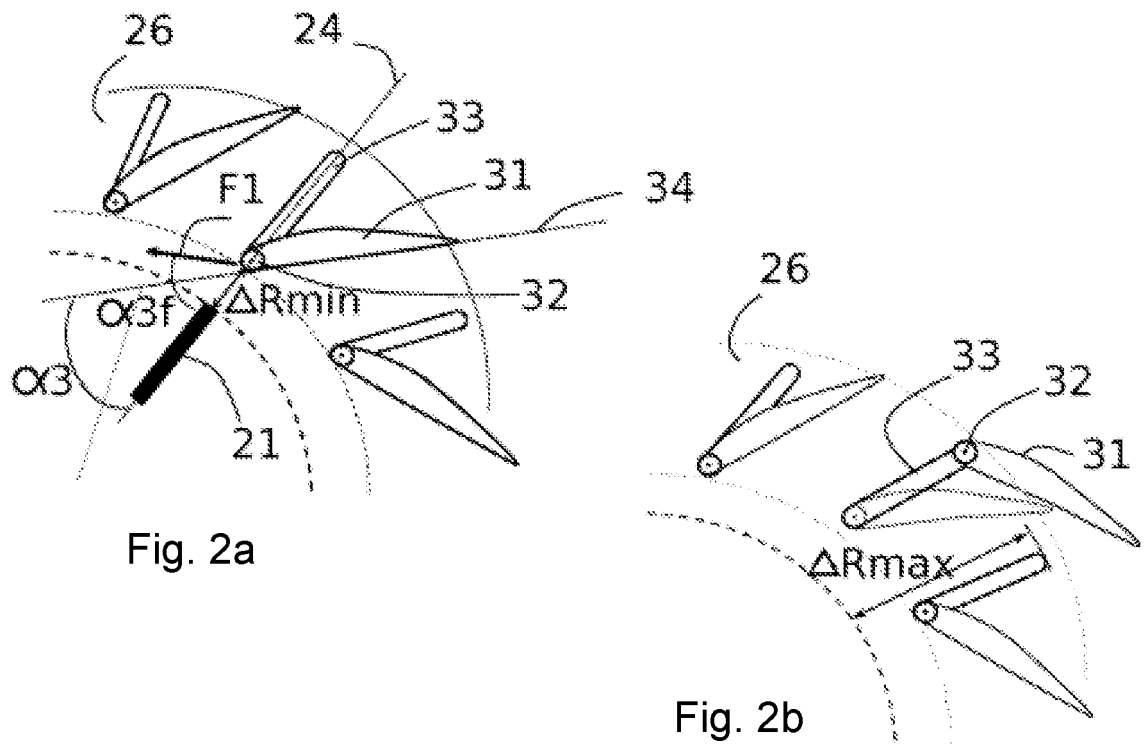
Fig. 2a
Fig. 2b

DISTRIBUTOR FOR A TURBOMACHINE RADIAL TURBINE, TURBOMACHINE COMPRISING SUCH A DISTRIBUTOR AND AIR CONDITIONING SYSTEM COMPRISING SUCH A TURBOMACHINE

CROSS-REFERENCE TO RELATED APPLICATIONS

This application is a § 371 national phase entry of International Application No. PCT/FR2019/052032, filed Sep. 3, 2019, which claims priority to French Patent Application No. 1857998, filed Sep. 6, 2018.

TECHNICAL FIELD OF THE INVENTION

The invention relates to a distributor for a turbomachine radial turbine, in particular intended to equip an air conditioning system of an aircraft.

TECHNOLOGICAL BACKGROUND

An air conditioning system conventionally comprises an air bleed device and an air cycle turbomachine comprising at least one compressor and one radial turbine, the compressor being supplied with air by the air bleed device, and the turbine comprising an air outlet supplying the cabin with air at a controlled temperature and flow rate. The system further comprises various heat exchangers, control valves and water extraction loops.

Different solutions are currently proposed to limit the air bleed on propulsion engines of the aircraft, and which in particular consist in providing more electric air conditioning systems.

This transition to electrification of the air conditioning system makes it necessary to optimize the various constituent elements of the system and in particular of the turbine of the air cycle turbomachine.

This turbine should make it possible to ensure a wide range of air flow rates while providing the maximum possible power over the entire operating range.

In particular, the turbine must be able to operate from a maintenance phase of the aircraft on the ground (which corresponds to a low flow rate and a high expansion rate) to a cruising flight phase of the aircraft (which corresponds to a high flow rate and a low expansion rate).

It has already been proposed to provide a turbine having a variable injection cross section. In a known manner, such a turbine comprises a casing, an impeller rotatably movable about a central axis equipped with vanes (also referred to by the term "rotor"), and a distributor arranged on the periphery of the movable impeller and comprising a plurality of blades for guiding the air flow toward the rotor.

There are currently two main solutions making it possible to vary the injection cross section of such a radial turbine.

The first solution consists in modifying the air passage cross section by the axial translational movement of the casing, which makes it possible to increase the height of the air stream for a given profile and blade pitch. This solution has the drawback of that it risks causing a restricted air intake at the impeller inlet, which generates secondary flows at the leading edge of the impeller and thus degrades the performance of the stage. U.S. Pat. No. 2,739,782 describes, for example, a turbine having a variable injection cross section according to this first solution.

The second solution consists in modifying the air passage cross section by pivoting the blades of the distributor of the turbine so that for a given profile and height of the air stream, the angle of the blades of the distributor may be modified. This solution requires the presence of a mechanical clearance at the distributor so as to allow the rotation of the blades, which reduces the efficiency of the stage. In addition, since the range of variation of the desired injection cross section is generally large (for example in the order of 1:4), there is a risk of misalignment of the impeller inlet for extreme openings or closings. There is also a risk of blockage at the impeller inlet. EP0332354 describes, for example, a turbine having a variable injection cross section according to this second solution.

None of the currently known solutions therefore makes it possible to modify the injection cross section over a wide range of flow rates while maintaining a level of performance and reliability which is compatible with the needs of air conditioning systems.

There is therefore a need to have an alternative solution enabling the drawbacks of the known solutions to be overcome.

AIMS OF THE INVENTION

The invention aims to provide a distributor of a radial turbine which overcomes at least some of the drawbacks of the known solutions.

The invention in particular aims to provide, in at least one embodiment, a distributor of a radial turbine which makes it possible to modify the injection cross section of the turbine over a wide range of flow rates while maintaining a level of performance and reliability which is compatible with aeronautical applications. The invention aims in particular to provide a distributor for a radial turbine of an aircraft air conditioning system.

The invention also aims to provide a radial turbine equipped with a distributor according to the invention and an air conditioning system comprising a turbine according to the invention.

DISCLOSURE OF THE INVENTION

To do this, the invention relates to a distributor of a turbomachine radial turbine comprising a rotor equipped with vanes adapted to be rotated about a central axis, said distributor comprising an annular grill extending about said central axis, intended to be arranged on the periphery of said rotor and comprising a plurality of variable-pitch blades arranged about said central axis delimiting between them a passage cross section of an air stream from said distributor to said rotor, each variable-pitch blade further extending in a main direction and having a leading edge and a trailing edge intended to be arranged facing the leading edge of the rotor vanes.

A distributor according to the invention is characterized in that each variable-pitch blade is mounted to be rotatably movable about a pivot shaft extending parallel to the central axis, this pivot shaft itself being movable relative to the central axis in one direction, called the translation direction, comprising at least one radial component, so that this blade may, upon actuation of control means, be pivoted about the pivot shaft and/or moved relative to the central axis in said translation direction so as to be able to modify said passage cross section of the air stream from upstream to downstream of the distributor, by respectively controlling the angle, called the metal angle, formed between the main direction of the blade and the radial direction, and the radial space between the trailing edge of the blade and the leading edge of the rotor vanes.

The invention therefore makes it possible to modify the passage cross section of the air stream from upstream to downstream of the distributor by controlling both the opening of the blade (i.e., the pivoting of the blade) and its position in the air stream. This is made possible by mounting each blade on a pivot shaft which is itself movable relative to the central axis in a translation direction which comprises at least one radial component, i.e., in a non-azimuthal or non-orthoradial direction (i.e., non-perpendicular to the radial direction).

A distributor according to the invention therefore makes it possible to modify both the angle formed between the main direction of the blade and the radial direction which defines the opening/closing of the blade and the radial space which separates the trailing edge of the blade and the leading edge of the rotor.

Thus, the movement of the blade in the air stream, both in the translation direction and/or in pivoting, makes it possible to improve the performance of the expansion stage. This improvement in the expansion stage makes it possible to obtain a turbine, the geometry of which may vary in operation and which has optimized efficiency over a wide range of air flow rates.

Advantageously and according to the invention, said pivot shaft of each blade is mounted to be movable in radial translation relative to the central axis so that said translation direction coincides with the radial direction.

This translation direction may for example be the radial direction according to an advantageous variant of the invention, but may also, according to other variants, be any non-azimuthal direction so that the movement of the pivot shaft in this direction makes it possible to modify the position of the pivot shaft relative to the central axis, and therefore to modify the radial spacing which separates the trailing edge of the blade and the leading edge of the rotor vanes.

Advantageously and according to the invention, said control means of said variable-pitch blades are configured to be able to control, for each blade, the pivoting of the blade about its pivot shaft concomitantly with the movement of the blade in said translation direction (by example the radial direction).

This advantageous variant makes it possible to control, for each blade, the angular position of the blade concomitantly with the radial distance which separates the trailing edge of the blade and the leading edge of the vanes of the rotor arranged opposite the blade. In other words, according to this advantageous embodiment, the pivoting of the blade about the pivot shaft and the movement of the blade in said translation direction of the blade are linked to one another and coordinated to be carried out simultaneously.

A distributor according to this variant allows the simultaneous variation of the pitch of the blade (i.e., its rotation about the pivot shaft) and of the radial position of the pivot point of this blade in the air meridian (i.e., the radial movement—or in the translation direction in the case of a non-exclusively radial movement—of the blade relative to the central axis). This simultaneous rotation and radial movement allows the injection cross section to be modified while improving the performance of the expansion stage.

Advantageously and according to the invention, said control means of each blade comprise mechanical axle return means making it possible to move said blade according to a radial translation of said blade.

Advantageously and according to the invention, said means for controlling said variable-pitch blades are configured to be able to keep, for each blade, and for any position of the pivot shaft of this blade, the coefficient $E1=\Delta R/H \cdot \cos(\alpha 3f)$ constant, where $\Delta R$ defines the radial space between the trailing edge of the blade and the leading edge of the rotor vanes, $\alpha 3f$ defines the angle formed between the air flow direction at the trailing edge of the blade and the radial direction, and $H$ defines the height, in the direction of the central axis, of the air stream.

This advantageous variant makes it possible to maintain the optimum E1 coefficient for all the blade adjustment configurations. In particular, this coefficient E1 is advantageously determined to be close to a predetermined specific value which ensures a good compromise between the friction losses and the losses due to the interactions between the trailing edge of the blades and the leading edge of the vanes.

Advantageously and according to the invention, the distributor comprises at least thirteen variable-pitch blades which are evenly distributed about the central axis.

It is nevertheless possible to design variant embodiments comprising less than thirteen variable-pitch blades and/or variable-pitch blades which are distributed unevenly about the central axis.

The invention also relates to a turbomachine radial turbine extending along a central axis and comprising a rotor equipped with vanes mounted to be rotatably movable about said central axis, a distributor arranged on the periphery of said rotor comprising a plurality of variable-pitch blades, and a volute comprising an air inlet and an air outlet opening onto said plurality of variable-pitch blades, characterized in that said distributor is a distributor according to the invention.

The advantages of a distributor according to the invention apply mutatis mutandis to a turbomachine according to the invention.

The invention also relates to an air conditioning system for an aircraft comprising a turbomachine comprising at least one turbine and one compressor, characterized in that said turbine is a radial turbine according to the invention.

The advantages of such a turbomachine according to the invention apply mutatis mutandis to an air conditioning system according to the invention.

The invention also relates to an aircraft comprising a cabin to be supplied with air at a pressure and a temperature which are controlled by an air conditioning system according to the invention.

The invention also relates to a distributor of a radial turbine, a radial turbine, and an air conditioning system characterized in combination by all or some of the features mentioned hereinbefore and hereinafter.

LIST OF FIGURES

Figure 4:
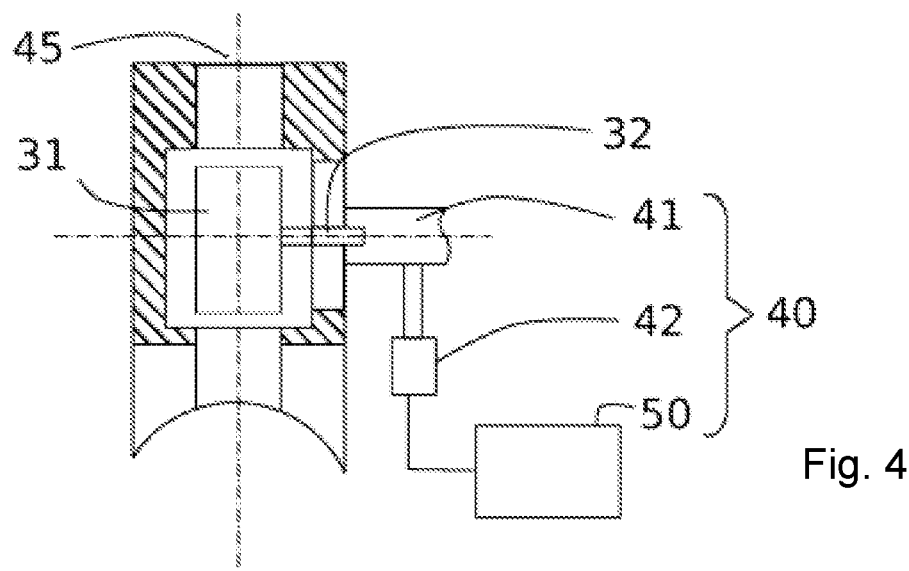
Figure 5:
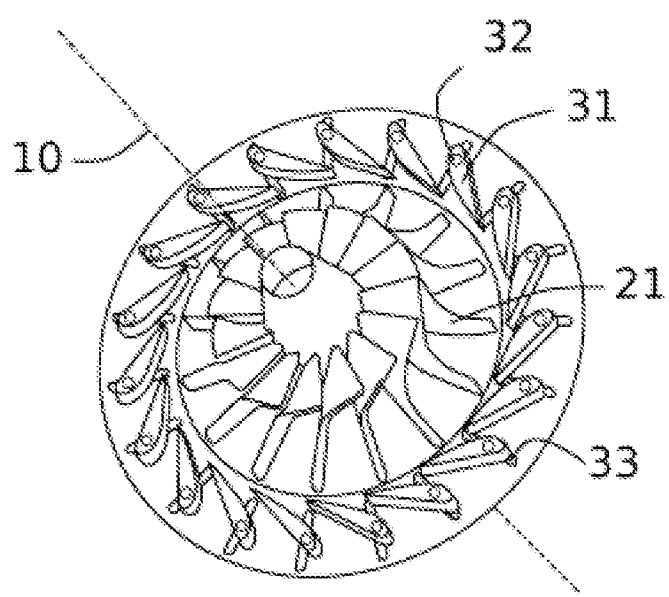

Further objects, features and advantages of the invention will become apparent upon reading the following description, which is provided solely by way of non-limiting example, and which refers to the appended figures, in which:

FIG. 1 is a schematic perspective view of a turbine according to one embodiment of the invention equipped with a distributor according to one embodiment of the invention, FIGS. 2a and 2b are partial schematic views of a distributor illustrating the movement of a blade both in pivoting and in radial translation, making it possible to modify independently the fluid angle $\alpha 3f$ and radial spacing $\Delta R$, FIG. 3 is a schematic perspective view of a blade of a distributor according to one embodiment of the invention, FIG. 4 is a partial schematic cross-sectional view of the distributor according to one embodiment of the invention in a longitudinal plane of the turbine along its axis of rotation, FIG. 5 is a schematic perspective view of a turbine impeller and of a turbine distributor according to one embodiment of the invention.

DETAILED DESCRIPTION OF ONE EMBODIMENT OF THE INVENTION

For the sake of illustration and clarity, the scales and proportions are not strictly adhered to in the figures. Throughout the detailed description which follows with reference to the figures, unless otherwise indicated, each element of the distributor is described as it is arranged when the distributor is mounted on a turbine. This arrangement is shown in particular in FIG. 1.

Moreover, identical, similar or analogous elements are denoted using the same references throughout the figures.

FIG. 1 schematically illustrates a radial turbine according to one embodiment of the invention which extends along a central axis 10 and comprises an impeller 20 that is rotatably movable about the central axis 10 and a distributor 30 arranged on the periphery of the impeller 20 on a casing 11 (of which only a half-casing is shown in FIG. 1). The impeller 20 is equipped with a plurality of vanes 21.

The turbine also comprises a volute 12 (of which a half-volute is shown in FIG. 1), the diameter of which decreases between an inlet 12a and an outlet 12b which opens onto the distributor 30.

The distributor 30 also comprises an annular grill 26 which extends about a central axis 10 and a plurality of variable-pitch blades 31, each variable-pitch blade 31 being integral with a pivot shaft 32 which extends parallel to the central axis 10.

FIG. 5 schematically illustrates, in perspective, the impeller 20 and the distributor 30 of the turbine according to one embodiment.

Each pivot shaft 32 is housed in a guide slot 33 of the blade shaft. This guide slot 33 extends in the radial direction, which forms the translation direction of the blade 31, in the embodiment of FIG. 5. Thus, the blade 31 may be pivoted about the pivot axis formed by the pivot shaft 32 and/or moved in the air stream by the sliding of the pivot shaft 32 in the guide slot 33.

Naturally, other means may be implemented to provide the radial movement of the pivot shaft. These means may thus, for example, comprise an axle return mechanism making it possible to provide a radial translation of the blade 31.

In FIGS. 1 and 5, and for each blade 31, the pivot shaft 32 of the blade is shown in the vicinity of the leading edge of the blade. Naturally, according to other embodiments, this pivot shaft 32 may be arranged elsewhere on the blade 31, in particular in the vicinity of the trailing edge of the blade, in the center of the blade, and generally at any point on the blade. The position of the pivot shaft 32 depends on the specifications targeted by the distributor according to the invention.

FIG. 3 illustrates schematically, and in more detail, a blade 31 integral with its pivot shaft 32, itself movable in radial translation in a guide slot 33.

The movement principle of the blades 31 of the distributor according to the invention is also evident from FIGS. 2a and 2b which schematically illustrate a blade 31 of a distributor according to another embodiment of the invention and a vane 21 of a rotor of a turbomachine arranged facing this blade 31. The metal angle $\alpha 3$ defines the angle formed between the main direction 34 of the blade 31 and the radial direction 24 along which extends a vane 21 of the rotor.

The fluid angle $\alpha 3f$ defines the angle formed between the flow direction of the fluid at the trailing edge of the blade 31, represented by an arrow referenced F1 in FIG. 2a, and the radial direction 24 along which extends the vane 21 of the rotor. Finally, the radial spacing $\Delta R$ defines the distance between the trailing edge of the blade 31 and the leading edge of the vane 21 of the rotor.

Each blade 31 is further mounted movable in radial translation in a radial guide slot 33 by sliding the pivot shaft 32 of the blade 31 in this guide slot.

FIG. 2a shows the blade 31 in a first position characterized by a given fluid angle $\alpha 3f$ and a given spacing $\Delta R$. This configuration corresponds to the positioning of the pivot shaft 32 of the blade 31 at a first radial end of the guide slot. This arrangement minimizes the radial spacing $\Delta R$, hence the label $\Delta Rmin$ in FIG. 2a. In FIG. 2b, the pivot shaft of the blade 31 is arranged at the opposite radial end of the guide slot 33. This arrangement maximizes the radial spacing $\Delta R$, hence the label $\Delta Rmax$ in FIG. 2b. In the case where the guide slot extends in the radial direction, the length of the slot defines the difference between $\Delta Rmax$ and $\Delta Rmin$.

Moreover, in the configuration of FIG. 2b, the blade 31 is pivoted relative to the configuration of FIG. 2a. The dotted line blade of FIG. 2b represents the blade 31 in the configuration of FIG. 2a in order to demonstrate the change in angle and radial position of the blade in the configuration of FIG. 2b.

The invention therefore makes it possible to impose on each blade 31 of the distributor an opening/closing angle and a radial position of the pivot shaft 32 of the blade 31. In particular, any intermediate configuration between the two extreme configurations (with regard to the radial position of the pivot point) shown in FIGS. 2a and 2b is permitted by a distributor according to the invention.

In FIGS. 2a and 2b, only a few blades are shown, it being understood that in practice, each blade may be moved both in pivoting about its pivot shaft and in radial translation.

The invention makes it possible in particular to keep the coefficient $E1=\Delta R/H \cdot \cos(\alpha 3f)$ constant by a control depending on the fluid angle $\alpha 3f$ and the spacing $\Delta R$ of the different blades 31 of the distributor.

FIG. 4 schematically illustrates the blade 31 and the control means 40 for adjusting the blade. These control means 40 comprise for example a shaft 41 which is mechanically connected to the shaft 32. This mechanical connection may for example comprise arms, pinions, bearings connected to electric or electromagnetic actuators 42, making it possible to mechanically connect the control shaft 41 and the movement shaft 32 of the blade 31. According to a preferred embodiment, a single actuator may be configured for all of the blades 31 of the distributor.

The actuators 42 are controlled by a central control unit 50, which may be of any type.

A distributor according to the invention is particularly intended to equip a turbine of an air conditioning system of an aircraft.

Such an air conditioning system typically also comprises a set of members enclosed in a casing and having air inlet and outlet connection ports and a dynamic air circulation channel, better known as RAM air, through one or more heat exchangers. Such a pack may be the subject of numerous variant embodiments which are compatible with the invention. For example, it may comprise at least one air cycle turbomachine which comprises a compressor and a turbine connected to one another by a rotating shaft. The turbomachine may also comprise a fan configured to ensure dynamic air circulation through the heat exchangers. According to another variant, the turbomachine may comprise an electric motor so as to form an electric air conditioning pack. The pack may also comprise a water extraction loop and a turbomachine outlet duct connected to a mixing chamber which opens into the cabin to be supplied with air at a controlled temperature and pressure. The turbine of the air cycle machine is, according to the invention, equipped with a distributor according to the invention, which allows the turbine to provide a wide range of air flow rates while delivering the most power possible over the entire operating range.

The principle of the invention could also be applied to a variable diffuser of a centrifugal compressor.

The invention has been described particularly for an aeronautical application. That said, the invention could also apply to an air conditioning system implemented in a motor vehicle, for example for an air supply system for a fuel cell.

The invention could also be applied to an air conditioning system for a railway vehicle and in general to any technical field requiring a modification of the injection cross section over a wide flow rate range.

The invention claimed is:

1. A distributor assembly of a turbomachine radial turbine comprising a rotor equipped with vanes adapted to be rotated about a central axis, said distributor comprising an annular grill extending about said central axis, arranged on the periphery of said rotor and comprising a plurality of variable-pitch blades arranged about said central axis delimiting between the blades a passage cross section of an air stream from said distributor to said rotor, each of the blades further extending in a main direction and having a leading edge and a trailing edge arranged opposite the leading edge on the rotor vanes, wherein each variable-pitch blade is mounted to be rotatably movable about a pivot shaft extending parallel to the central axis, the pivot shaft being movable relative to the central axis in a translation direction comprising at least one radial component, so that each corresponding one of the blades, upon actuation of control means, pivoted about the pivot shaft or moves relative to the central axis in said translation direction so as to be able to modify said passage cross section of the air stream from upstream to downstream of the distributor, by controlling respectively a metal angle formed between the main direction of the corresponding one of the blades and the radial direction, and the radial spacing which separates the trailing edge of the corresponding one of the blades and the leading edge of the rotor vanes;

wherein said pivot shaft of each corresponding one of the blades is mounted to be movable in radial translation with respect to the central axis so that said translation direction coincides with the radial direction.

2. The distributor according to claim 1, wherein said control means of said blades are configured to be able to control, for each corresponding one of the blades, the pivoting of the corresponding one of the blades about its pivot shaft concomitantly with the movement of the corresponding one of the blades in said translation direction.

3. The distributor according to claim 1, wherein said control means of each corresponding one of the blades comprises mechanical axle return means making it possible to move said corresponding one of the blades according to a radial translation of said blade.

4. The distributor according to claim 1, wherein said control means of said blades are configured to be able to keep, for each corresponding one of the blades, and for any position of the pivot shaft of the corresponding one of the blades, the coefficient $E1=\Delta R/H \cdot \cos(\alpha 3f)$ constant, where $\Delta R$ defines the radial spacing between the trailing edge of the corresponding one of the blades and the leading edge of the rotor vanes, $\alpha 3f$ defines the angle formed between the direction of air flow at the trailing edge of the corresponding one of the blades and the radial direction, and H defines the height, in the direction of the central axis, of the air stream.

5. The distributor according to claim 1, wherein the distributor comprises at least thirteen of the blades which are evenly distributed about the central axis.

6. A turbomachine radial turbine extending along a central axis and comprising a rotor equipped with vanes mounted to be rotatably movable about said central axis, a distributor arranged on the periphery of said rotor comprising a plurality of variable-pitch blades, and a volute comprising an air inlet and an air outlet opening onto said plurality of variable-pitch blades, wherein said distributor is a distributor comprising: the plurality of variable-pitch blades arranged about said central axis delimiting between the plurality of variable-pitch blades a passage cross section of an air stream from said distributor to said rotor, each of the variable-pitch blades further extending in a main direction and having a leading edge and a trailing edge arranged opposite the leading edge on the rotor vanes, wherein each variable-pitch blade is mounted to be rotatably movable about a pivot shaft extending parallel to the central axis, the pivot shaft being movable relative to the central axis in a translation direction comprising at least one radial component, so that the each variable-pitch blade, upon actuation of control means, pivots about the pivot shaft and/or moves relative to the central axis in said translation direction so as to be able to modify said passage cross section of the air stream from upstream to downstream of the distributor, by controlling respectively a metal angle formed between the main direction of the variable-pitch blade and the radial direction, and the radial spacing which separates the trailing edge of the variable-pitch blade and the leading edge of the rotor vanes; wherein said pivot shaft of each variable pitch blade is mounted to be movable in radial translation with respect to the central axis so that said translation direction coincides with the radial direction.

7. An air conditioning system for an aircraft comprising a turbomachine comprising at least one turbine and one compressor, wherein said turbine is a radial turbine extending along a central axis and comprising a rotor equipped with vanes mounted to be rotatably movable about said central axis, a distributor arranged on the periphery of said rotor comprising a plurality of variable-pitch blades, and a volute comprising an air inlet and an air outlet opening onto said plurality of variable-pitch blades, wherein said distributor is a distributor comprising: the plurality of variable-pitch blades arranged about said central axis delimiting between the plurality of variable-pitch blades a passage cross section of an air stream from said distributor to said rotor, each of the variable-pitch blades further extending in a main direction and having a leading edge and a trailing edge arranged opposite the leading edge on the rotor vanes, wherein each variable-pitch blade is mounted to be rotatably movable about a pivot shaft extending parallel to the central axis, the pivot shaft being movable relative to the central axis in a translation direction comprising at least one radial component, so that the variable-pitch blade, upon actuation of control means, pivots about the pivot shaft and/or moves relative to the central axis in said translation direction so as to be able to modify said passage cross section of the air stream from upstream to downstream of the distributor, by controlling respectively a metal angle formed between the main direction of the variable-pitch blade and the radial direction, and the radial spacing which separates the trailing edge of the blade and the leading edge of the rotor vanes; wherein said pivot shaft of each variable pitch blade is mounted to be movable in radial translation with respect to the central axis so that said translation direction coincides with the radial direction.

* * * * *